(12) United States Patent
Shapiro et al.

(10) Patent No.: US 10,943,000 B2
(45) Date of Patent: *Mar. 9, 2021

(54) SYSTEM AND METHOD FOR SUPPLYING SECURITY INFORMATION

(71) Applicant: Tokenize, Inc., Rochester, NY (US)

(72) Inventors: Steve Shapiro, Livonia, NY (US); Melanie Shapiro, Livonia, NY (US); Richard Lourette, Fairport, NY (US); Michael W. Allen, Shortsville, NY (US); Stephen L. Schultz, West Henrietta, NY (US)

(73) Assignee: Tokenize, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,888

(22) Filed: Jul. 18, 2019

(65) Prior Publication Data

US 2020/0159896 A1 May 21, 2020

Related U.S. Application Data

(63) Continuation of application No. 15/672,896, filed on Aug. 9, 2017, now Pat. No. 10,366,220.

(Continued)

(51) Int. Cl.
*G06F 21/32* (2013.01)
*G06F 21/82* (2013.01)
(Continued)

(52) U.S. Cl.
CPC ............. *G06F 21/32* (2013.01); *G06F 21/35* (2013.01); *G06F 21/602* (2013.01); *G06F 21/82* (2013.01); *H04L 63/0492* (2013.01); *H04L 63/083* (2013.01); *H04L 63/0861* (2013.01); *H04W 4/80* (2018.02); *H04W 12/06* (2013.01); *H04W 12/0605* (2019.01)

(58) Field of Classification Search
CPC ........ G06F 21/32; G06F 21/35; G06F 21/602; G06F 21/82; H04W 4/80; H04W 12/06; H04W 12/0605; H04L 63/0492; H04L 63/083; H04L 63/0861
USPC ....................................................... 340/5.82
See application file for complete search history.

(56) References Cited

U.S. PATENT DOCUMENTS

| 7,898,385 B2 | 3/2011 | Kocher |
| 9,258,036 B1 | 2/2016 | Ting et al. |

(Continued)

FOREIGN PATENT DOCUMENTS

EP 3037999 6/2016

OTHER PUBLICATIONS

Extended European Search Report regarding European Patent App. No. 17849278.1, dated Feb. 25, 2020.

(Continued)

*Primary Examiner* — Edwin C Holloway, III
(74) *Attorney, Agent, or Firm* — Dunlap Codding, P.C.

(57) ABSTRACT

A wearable device having one or more processors configured to receive one or more signals representative of biometric parameter(s) and sensed presence of a user. The one or more processors configured to compare the biometric parameter to a stored user parameter for authentication of the user. Upon authentication, the one or more processors switch from a locked mode to an unlocked mode to enable communication.

20 Claims, 6 Drawing Sheets

Related U.S. Application Data

(60) Provisional application No. 62/384,257, filed on Sep. 7, 2016.

(51) Int. Cl.
    *H04L 29/06*     (2006.01)
    *G06F 21/35*     (2013.01)
    *G06F 21/60*     (2013.01)
    *H04W 12/06*     (2009.01)
    *H04W 4/80*     (2018.01)

(56) References Cited

U.S. PATENT DOCUMENTS

| | | |
|---|---|---|
| 9,313,609 B2 | 4/2016 | Prencipe |
| D756,999 S | 5/2016 | von Badinski et al. |
| 9,582,034 B2 | 2/2017 | von Badinski et al. |
| 9,958,904 B2 | 5/2018 | von Badinski et al. |
| 10,366,220 B2* | 7/2019 | Shapiro ................ H04L 63/083 |
| 2009/0150667 A1 | 6/2009 | Baltzer |
| 2014/0089672 A1 | 3/2014 | Luna et al. |
| 2014/0197783 A1 | 7/2014 | Kim et al. |
| 2014/0279528 A1 | 9/2014 | Slaby et al. |
| 2015/0028996 A1* | 1/2015 | Agrafioti ................ G06F 21/34 340/5.82 |
| 2015/0042450 A1 | 2/2015 | McLear |
| 2015/0220109 A1* | 8/2015 | von Badinski .... G02B 19/0061 340/539.12 |
| 2016/0092665 A1 | 3/2016 | Cowan et al. |
| 2018/0068105 A1* | 3/2018 | Shapiro ................ G06F 21/32 |
| 2018/0181736 A1* | 6/2018 | Shapiro ................ G06F 21/32 |

OTHER PUBLICATIONS

PCT International Search Report and Written Opinion regarding PCT App. No. PCT/US2017/046124, dated Oct. 27, 2017.

USPTO Office Action regarding U.S. Appl. No. 15/875,558 dated Apr. 5, 2018, 8 pages.

\* cited by examiner

SYSTEM AND METHOD FOR SUPPLYING SECURITY INFORMATION

CROSS-REFERENCE TO RELATED APPLICATION

The present application is a continuation of U.S. Ser. No. 15/672,896, filed on Aug. 9, 2017, and claims the benefit of U.S. Ser. No. 62/384,257, filed on Sep. 7, 2016, which are hereby incorporated by reference in their entirety.

BACKGROUND

In the electronic age, the number of keys, whether physical, electronic, or cybernetic, has drastically increased. For example, a given person may carry house keys, car keys, work keys, and/or the like. Additionally, such person may have one or more radio-frequency identification (RFID) badges, access cards, and/or automated teller machine (ATM) cards providing for access to bank lobbies. Further, passwords may be included on phones, computers, online and other accounts being used for any number of purposes. Each of these present security weaknesses. For example, regarding physical keys, possession of the physical key gains access. However, if the physical key is lost or stolen, not only is your access limited, but an outside party may now have access to your house, car or office. In another example, cybernetic keys, such as passwords, may be selected for ease in remembrance. Yet, such passwords may be easily determined and/or hacked. Additionally, use of the same password over multiple accounts may leave such accounts compromised in such an event.

Several products on the market today attempt to address these issues. For example, "master password" services provide unique, hard to hack passwords for accounts, storing them in an encrypted format in a "password vault" accessible using a "master password." While this may solve the issue of remembering multiple unique passwords and use of a sole password for multiple accounts, if the master key is ever compromised, all passwords may need changing. Further, a sole "master password" for entrance into the vault provides a point of weakness. Such "master password" systems only involved cybernetic passwords, and do not provide any system for physical and/or electronic keys.

With the growing number of electronic lock capabilities for cars, homes, offices, and the like, reliance on physical keys may be decreasing. As such, systems currently available may provide a means to store multiple electronic keys on a single device. This may be beneficial for convenience as it obviates the needs to carry multiple key fobs, access cards, RFID tags, and/or the like. Again, however, such systems present security vulnerability as possession of a master key gains access and if the master key is lost and/or stolen, an outside party may now have access to all electronic locks.

Multi-factor security may be used to solve these issues. Such three security factors may often be described as "what you have," "what you know," and "who you are." The "what you have" factor refers to possession (e.g., having a physical key granting access). The "what you know" factor refers to something known (e.g., a password, PIN, key phrase, and/or the like, granting access). The "who you are" factor refers to biometrics (e.g., a fingerprint scan, retinal scan, and the like, granting access). Generally, a multi-factor solution may utilize two of the three security factors, with some systems incorporating all three.

Smartphones have recently added two factor authentication. For example, some forms of keys (e.g., credit cards) may require both possession of a phone and a fingerprint scan with each transaction (e.g., transaction at a contactless payment credit card terminal).

BRIEF DESCRIPTION OF THE DRAWINGS

These and other objects and features of the present invention will be more fully disclosed or rendered obvious by the following detailed description of the invention, which is to be considered together with the accompanying drawings wherein like numbers refer to like parts, and further wherein.

DETAILED DESCRIPTION OF EXEMPLARY EMBODIMENTS

Figure 1:
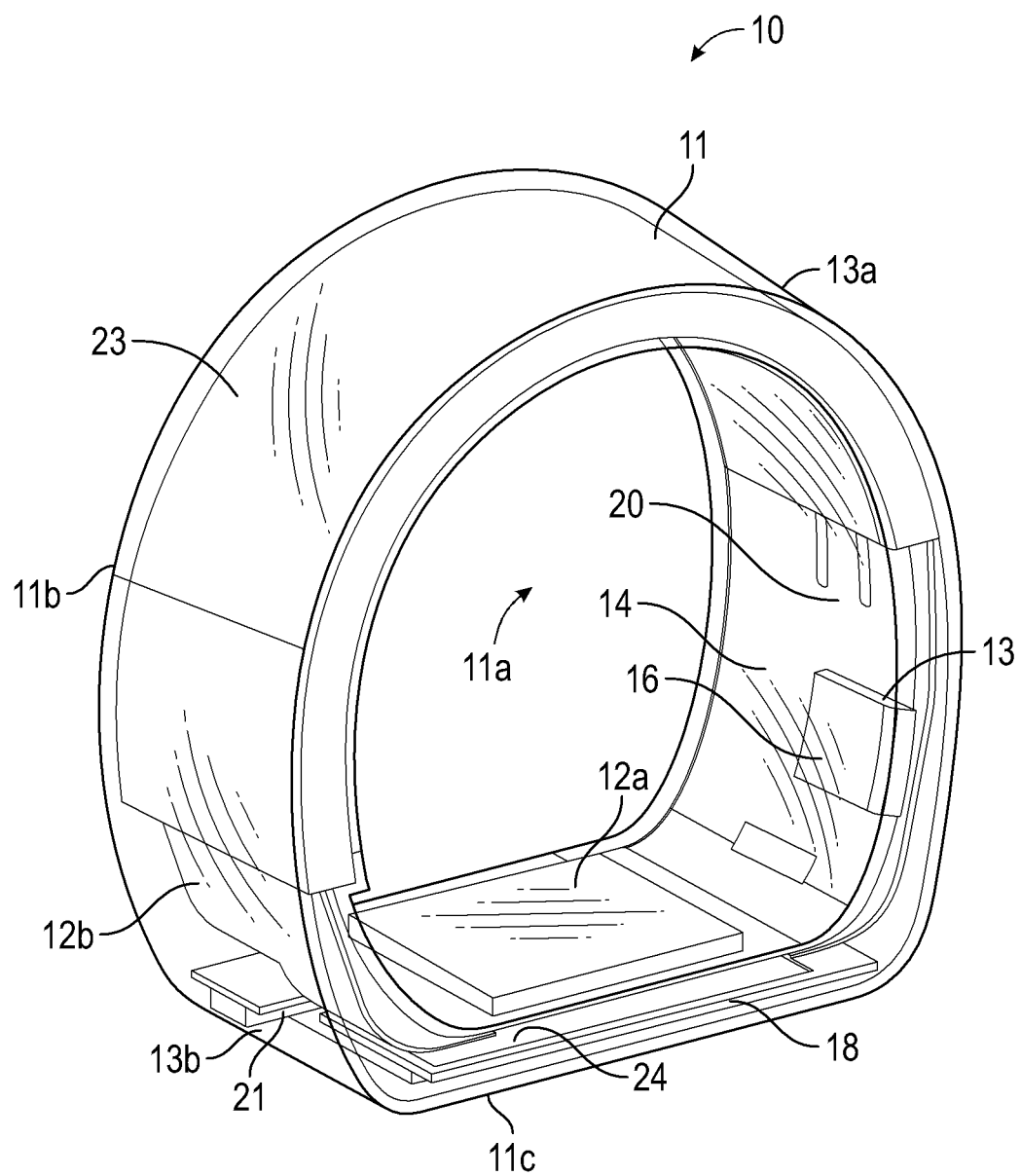
FIG. 1 is a perspective view of an exemplary wearable device in accordance with the present invention.

Before explaining at least one embodiment of the presently disclosed and claimed inventive concepts in detail, it is to be understood that the presently disclosed and claimed inventive concepts are not limited in their application to the details of construction, experiments, exemplary data, and/or the arrangement of the components set forth in the following description or illustrated in the drawings. The presently disclosed and claimed inventive concepts are capable of other embodiments or of being practiced or carried out in various ways. Also, it is to be understood that the phraseology and terminology employed herein is for purpose of description and should not be regarded as limiting.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, certain well-known features may not be described in detail in order to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

The term "and combinations thereof" as used herein refers to all permutations or combinations of the listed items preceding the term. For example, "A, B, C, and combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. A person of ordinary skill in the art will understand that typically there is no limit on the number of items or terms in any combination, unless otherwise apparent from the context.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

The use of the terms "at least one" and "one or more" will be understood to include one as well as any quantity more than one, including but not limited to each of, 2, 3, 4, 5, 10, 15, 20, 30, 40, 50, 100, and all integers and fractions, if applicable, therebetween. The terms "at least one" and "one or more" may extend up to 100 or 1000 or more, depending on the term to which it is attached; in addition, the quantities of 100/1000 are not to be considered limiting, as higher limits may also produce satisfactory results.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

Certain exemplary embodiments of the invention will now be described with reference to the drawings. In general, such embodiments relate to thermic infusion systems and methods.

Figure 2:
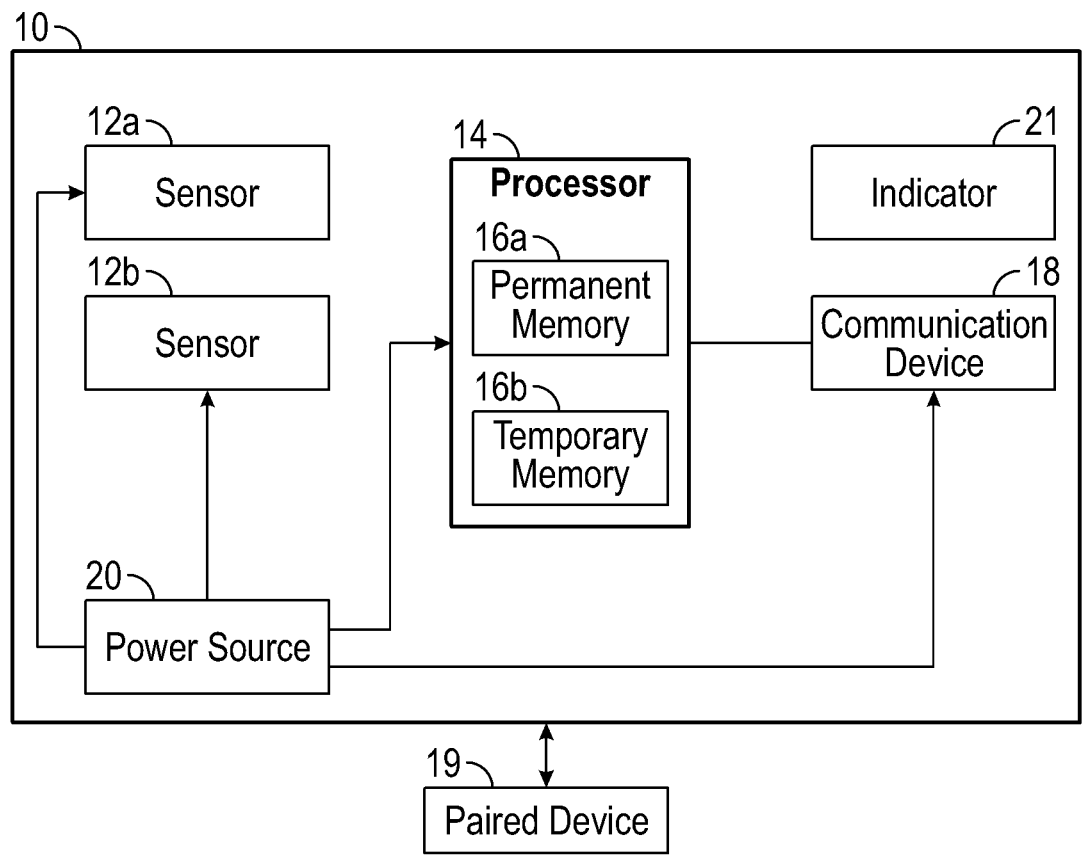
FIG. 2 is a block diagram of the exemplary wearable device illustrated in FIG. 1.

Referring now to the Figures, and in particular FIGS. 1 and 2, illustrated therein is an exemplary wearable device 10 constructed in accordance with the present disclosure. Generally, the wearable device 10 may provide multi-factor security for one or more cybernetic keys, electronic keys, and/or the like. In some embodiments, the wearable device 10 may appear to be an ornament for personal adornment, such as, for example, a ring, bracelet, necklace, earring, cuff link, and/or any article configured to be worn on a person or animal. In some embodiment, the wearable device 10 may be worn and/or positioned adjacent to skin. Use of the wearable device as a multi-factor security system may include, but is not limited to, logical access (e.g., laptop, phone, website), physical access cards, house keys, car keys, transit card, credit cards, passports, drivers licenses, insurance cards, membership/loyalty cards, ticket (e.g., planes, trains, concert, events), medical records, identity artefacts, and/or the like.

In addition to personal use, the wearable device may also be used within hospitals and other locations wherein access control may be needed. In hospitals, for example, doctors, nurses, and/or other practitioners may be able to use and/or adjust medical devices. Such medical devices may include security limiting access to one or more setting changes. For example, the medical device may provide for a doctor or other medical practitioner to log-in to adjust settings of the medical device. The wearable device may communicate with the medical device to provide authorization of the user (e.g., doctor) when the wearable device is positioned on the practitioner (e.g., placed on finger) and remains authorized while the wearable device remains on the practitioner providing a secure notification to the medical device that the authorized practitioner is present, for example. The wearable device may then deactivate when removed from the practitioner, and communicate with the medical device to provide a notification to the medical device that the practitioner is no longer authorized to change one or more settings. Additionally, in some embodiments, the wearable device may provide one or more notifications to the medical device as a part of the process for authorizing the practitioner to login into the medical device. For example, the wearable device and/or the medical device may be programmed and provided with suitable sensors, such as a plurality of accelerometers, to sense a predetermined movement of the practitioner as part of the authorization process. For example, the predetermined movements may be the authorized practitioner tapping or manipulating (e.g., rotate) the medical device (e.g., tapping the medical device twice with the hand wearing the wearable device). One or more instructions may be transmitted from the wearable device to send authorization to the requesting medical device, for example. In some embodiments, the wearable device may present a cryptographic challenge and answer for security. As the wearable device includes biometric authorization for authorization of the practitioner, security is at least a two-factor authentication process. In some embodiments, at least a three-factor authentication process may be implemented as a user may provide selected motion to unlock and/or provide authorization of the practitioner. In some embodiments, one or more identifiers may log presence of the practitioner. For example, if a nurse is required to visit specific beds in an Intensive Care Unit at least every thirty minutes, one or more sensors may be positioned within the Intensive Care Unit and/or within the general vicinity of the Intensive Care Unit such that when the wearable device is within a pre-determined proximity to the one or more sensors, one or more identifiers may be transmitted and/or exchanged with the sensors to log presence of the nurse. Identifiers may include, but are not limited to, practitioner identification number, pre-determined code, time stamp, date stamp, and/or the like. In some embodiments, a near field broadcasting device may be used in lieu of or in addition to the one or more sensors. The near field broadcasting device may be active and/or passive. Generally, the wearable device may detect presence of the near field broadcasting device and record the broadcast identification number (e.g., room number), and store the broadcast identification number in the wearable device. Additional information may also be stored including, but not limited to, the current time, date, and/or the like. In some embodiments, broadcast identification number(s) may be downloaded and stored on a main logging system (e.g., head nurse station).

In some embodiments, the wearable device may be used for identification using digital IDs, including, but not limited to, driver's license, passport, hunting license, identification card, and/or the like. Identifiers may include, but are not limited to, name, photograph, address, date of birth, eye color, license number, and/or the like. Identifiers may be stored in one or more secure elements (e.g., memory) of the wearable device. In some embodiments, a private key/public key pair and/or checksum may be generated, with the private key being stored in the secure element and the public key and checksum being stored on the wearable device, as well as, in a database at the server for licensing authority (e.g., Department of Motor Vehicles, U.S. Passport Office). In some embodiments, an external device (e.g., smartphone, tablet, computer, reader device, and/or the like), may transmit a challenge to the wearable device. If the wearable device is unlocked, the wearable device may create and transmit a packet of information to the external device. The packet of information may include a public key, the license data, the checksum, the challenge information, and/or a digital signature of the checksum and challenge data. The external device may receive the packet of information, and perform one or more local verifications using information from the packet of information. For example, the external device may verify that the license data transmitted has the same and/or similar checksum contained in the information packet, that the signed content contains the challenge issued and/or checksum as provided, digital signature was generated by the private key associated with the public key, and/or the like. The external device may provide verification by contacting one or more remote database from the licensing authority to verify that the checksum (i.e., verification license information is unaltered) and public key (i.e., verification that license information is unaltered) provided by the wearable device correspond to one or more entries in the database. In some embodiments, one or more photographs may be stored locally in the external device or in the remote database. The one or more photographs may be displayed on the external device such that the requesting individual may perform an additional authentication. In addition to traditional identity requests, multi-factor authentication may be used for "Know Your Customer" applications (e.g., opening bank account, bar authenticating age of individual wearing device, and/or the like). Activation may be via proximity (e.g., pre-determined range to a near field broadcasting device) and/or gesture activated (e.g., knocking twice in proximity of a Bluetooth receiver).

The wearable device 10 may provide multi-factor security in a manner simplifying carrying of a secure master key while also simplifying validation of the master key. The wearable device 10 may be secured via a biometric signature and activated solely during use by a user (i.e., activated upon being worn by the user). The wearable device 10 is possessed by the user with biometrics securing information associated with the wearable device 10. Thus, if lost or stolen, the wearable device 10 may be unusable by an outside party as biometric data of the outside party may not validate use of the wearable device 10. In some embodiments, additional validation may be included. For example, one or more optional passwords may be used and entered via a securely paired device, a complex series of motions, and/or the like. With additional validation, three distinct security factors (e.g., user possession factor, user biometric factor, additional validation information including a password, complex series of motions or the like) may be used to authorize one or more transactions.

In some embodiments, the wearable device 10 may be paired solely to a particular user. In some embodiments, multiple wearable devices 10 may be paired and/or pairable solely to a particular user. As such, transactions initiated and/or confirmed by the wearable device 10 may have multi-factor authentication by possession (e.g., physical possession of the wearable device 10), identity (e.g., confirmation that the user of the wearable device 10 is the particular user), and knowledge (e.g., execution of a known pattern for verification).

The wearable device 10 may include a housing 11 formed of any material configured to be worn on a user. In some embodiments, the housing 11 may be formed of a waterproof material for protecting one or more components housed within the wearable device 10. In some embodiments, one or more portions of the housing 11 may be formed of a shielded skin (i.e., formed of waterproof material protecting one or more components within the housing 11) and unshielded skin (i.e., open to environment or configured to accept one or more biometric readings from a user). The housing 11 may be formed in any shape including, but not limited to, a sphere, a ring, a cone, a cube, a rectangular prism, a cylinder, a triangular prism, a pyramid, and/or any fanciful shape. In the example depicted in FIG. 1, the housing 11 is formed into a shape of a ring defining a passage 11a sized and dimensioned to receive the user's finger. In this example, the housing 11 is formed into a non-cylindrical shape such that the passage 11a is non-circular. For example, the housing 11 may include an arc-shaped portion 11b, and a planar portion 11c.

Referring to FIGS. 1 and 2, the wearable device 10 may generally include one or more sensors 12, one or more processors 14, one or more memories 16, one or more communication devices 18, and one or more power sources 20 supported by the housing 11. In the example shown, the one or more sensors 12, and the one or more communication devices 18 can be positioned either within or on the planar portion 11c, and the one or more processors 14, one or more memories 16 and the one or more power sources 20 can be positioned within the arc-shaped portion 11b. The one or more sensors 12, the one or more memories 16, and the one or more communication devices 18 may be coupled to the one or more processors 14. For example, in some embodiments, the one or more sensors 12, the one or more memories 16, and/or the one of more communication devices 18 may be coupled to the one or more processors 14 using a bus. In some embodiments, one or more sensors 12 may be supported by the housing 11 yet have a portion exposed to the passage 11a. In these embodiments, the portion of the one or more sensors 12 may be configured to be positioned adjacent to a user's skin. For example, as illustrated in FIG. 1, if the wearable device 10 is a ring to be worn on a user's finger, one or more sensors 12 may be connected to the housing 11, and positioned on an interior surface 13 of the housing 11 of the wearable device 10 such that the sensors 12 are adjacent to a user's skin during use and detect the presence of the user.

The power source 20 may be any source configured to supply electrical energy to components of the wearable device 10. For example, in some embodiments, the power source 20 may be a rechargeable battery. In some embodiments, the power source 20 may include a battery 23 formed to the shape of at least a portion of the housing 11 as shown in FIG. 1. For example, when the housing 11 has an arc-shaped portion 12b, the power supply 20 (e.g., the battery 23) may have an arcuate shape.

The one or more sensors 12 may occupy a small amount of space relative to the wearable device 10 and have low power consumption in standby mode and during use. The one or more sensors 12 may be configured to determine pressure, temperature, light, speed, electrical capacity, and/or the like and transmit a signal to the one or more processors 14. In some embodiments, the one or more sensors 12 may be a transducer configured to convert a biometric parameter (e.g., acoustic signal from a user's voice and/or the like) of a person into an electric signal. For example, a first sensor 12a may include a transducer configured to convert an acoustic signal into an electric signal. Alternatively, the first sensor 12a may be implemented in other ways, including, but not limited to a fingerprint scanner, a retinal scanner, a face scanner, and/or other biometric scanner. In some embodiments, the biometric scan may include a cryptographic hash function (e.g., digital hash). By using a cryptographic hash function, as further described in U.S. Ser. No. 15/269,554, the entire disclosure of which is herein incorporated by reference in its entirety, the biometric hash may be used to both unlock the wearable device 10 and to secure sensitive data on the wearable device 10.

In some embodiments, the first sensor 12a (e.g., biometric scanner) may be activated upon a user placing the wearable device 10 on the body. For example, with a user sliding the wearable device 10 onto a finger, a fingerprint scan may be obtained. As such, the first sensor 12a may have a planar configuration, and may be positioned on the interior surface 13 in the planar portion 11c of the housing 11 of the wearable device 10.

In some embodiments, a second sensor 12b (e.g., wear sensor) may be configured to monitor if the wearable device 10 is currently in use. Use of the wearable device 10 may include substantially constant contact with skin, kinetic motion, and/or the like. To that end, the second sensor 12b may be implemented in a variety of manners including, but not limited to, external capacitance change detection (Cap Sense), inductance change detection, biometric sensing (e.g., thermal sensor, heart beat sensor, blood oxygen sensor), and/or the like. In some embodiments, a biometric scanner, such as a fingerprint scanner, may be used to monitor if the wearable device 10 is currently in use (e.g., contact with skin, kinetic motion). In some embodiments, one single sensor 12 may be used to unlock the wearable device 10 and monitor if the wearable device 10 is currently in use. In the example shown in FIG. 1, the arc-shaped portion 11b is formed of a shielded skin (i.e., formed of waterproof material protecting one or more components within the housing 11) and the planar portion 11c is formed with unshielded skin overlying the first sensor 12a and the second sensor 12b to permit the first sensor 12a and the second sensor 12b to sense the biometric information, and the presence of the user. In this example, shielded skin surrounds, and protects the communication device 18.

In some embodiments, one or more sensors 12 may be located external and at a distance from the wearable device 10. For example, one or more sensors 12 may be positioned in a paired device 19. In some embodiments, the paired device 19 may be positioned at a stationary location separate from a user's body. In some embodiments, the paired device 19 may be worn on the user's body. Generally, the paired device 19 may be located in proximity to the wearable device 10. In some embodiments, the paired device 19 may be located remotely from the wearable device 10 and communicate with the wearable device 10 via the communication device 18, one or more networks, and/or the like. In some embodiments, the paired device 19 may be a smartphone or a tablet computer, for example.

In some embodiments, in addition to the one or more sensors 12, the wearable device 10 may include one or more indicators 21 configured to provide specific information on a state or condition of the wearable device 10. The one or more indicators 21 may be visual, auditory, haptic and/or the like. For example, the one or more indicators 21 may include a visual indicator, such as an LED, or other type of light. In some embodiments, multiple visual indicators may provide information on a plurality of states or conditions of the wearable device 10. For example, a multi-color LED device may be used to provide information on a plurality of states or conditions of the wearable device 10.

In another example, the one or more indicators 21 may include a haptic indicator, such as a vibration or pulse. In some embodiments, the one or more indicators 21 may include a visual screen. The visual screen may include a graphical user interface, for example.

In some embodiments, one or more indicators 21 may be included in the paired device 19 (e.g., smartphone). The one or more indicators 21 may provide information to the user regarding state or condition of the wearable device 10 via output received by the paired device 19 (e.g., smartphone). Additionally, a user may be able to provide input to the wearable device 10 via the paired device 19. For example, confirmation of receipt of information regarding the state or condition of the wearable device 10 may be input via a tap or rotation of the paired device 19. Such input may be communicated to the wearable device 10 from the paired device 19.

In some embodiments, a secure connection may be established between the paired device 19 and the wearable device 10 prior to initial communication between the paired device 19 and the wearable device 10. The secure connection may decrease security breaches, such as, malware intended to damage or disable systems (e.g., malware on the paired device 19). The secure connection may be obtained via multiple methods. For example, a cryptographic key pair may be shared between the wearable device 10 and the paired device 19 (e.g., an application running on the paired device 19). The cryptographic key pair may be configured to validate that authorized software is running on the paired device 19.

In some embodiments, to establish a secure connection, the wearable device 10 may provide information that a user enters on the paired device 19 such that the information may be communicated to the wearable device 10 allowing each of the wearable device 10 and the paired device 19 to be in control of the same user. For example, the indicator 21 on the wearable device 10 may include a plurality of separate LED colors. A pattern of LED colors may be flashed. The user of the wearable device 10 may then select corresponding colors on an application running on the paired device 19. In some embodiments, this process may be repeated multiple times to ensure the wearable device 10 and the paired device 19 are both controlled by the user. For example, the process may be repeated four different cycles. Additionally, the paired device 19 may request action of the user with regard to the wearable device 10. For example, the paired device 19 may request the user to rotate the wearable device 10 or tap the wearable device 10 in a particular pattern or a set number of times. After performing the request, the wearable device 10 may communicate to the paired device 19 that the wearable device 10 is controlled by the user. In some embodiments, this process may be repeated multiple times (e.g., three unique motions requested).

The one or more processors 14 may include a single processor or multiple processors working independently and/or together to execute the logic described herein. In some embodiments, the one or more processors may or may not be located in a single physical location. Additionally, multiple processors may or may not be located in a single physical location. In some embodiments, the one or more processors may be partially or completely network-based and/or cloud-based. As used herein, the terms "network-based," "cloud-based," and any variations thereof, may include the provision of configurable computational resources on demand via interfacing with a computer and/or computer network, with software and/or data at least partially located on the computer and/or computer network, by pooling processing power of two or more networked processors.

The one or more memories 16 may be implemented as a conventional non-transitory memory, such as, for example, random access memory (RAM), read only memory (ROM), flash memory, combinations thereof, and/or the like, for example. The term non-transitory computer readable medium, as used herein, may be implemented as a single physical device or multiple physical devices of a distributed system that may or may not be logically related. To that end, the one or more memories 16 may be located in the same physical location. Alternatively, the one or more memories 16 may be located in a different location and communicate via a network. Additionally, one or more of the memories 16 may be implemented as a "cloud memory" (i.e., one or more memories may be partially or completely based on or accessed using a network, for example).

The one or more memories 16 may store processor executable code and/or information comprising one or more databases and program logic. In some embodiments, the processor executable code may be stored as a data structure, such as a database and/or data table, for example. In some embodiments, a first memory 16a may be designated a permanent memory and a second memory 16b may be designated a temporary memory as illustrated in FIG. 2. Logic may be embodied in the form of software instructions and/or firmware, and may be executed on appropriate hardware. For example, logic embodied in the form of software instructions or firmware may be executed via the one or more processors 14. In some embodiments, logic may be implemented in a stand-alone environment operating on a single processor 14 and/or logic may be implemented in a networked environment, such as a distributed system using multiple processors 14.

The communication device 18 may be a system configured to provide communication and charging capabilities for the wearable device 10. For example, in some embodiments, the communication device 18 may include a dual use of a near field communications antenna for communications and for charging. While the use of the communication device 18 is described in relation to the wearable device 10 herein, it should be apparent to one skilled in the art that the communication device 18 may be used in other ring devices, small wearable device, and/or wearable and non-wearable devices in general needing to minimize space constraints by combining communication and charging capabilities into a single device.

Figure 3A:
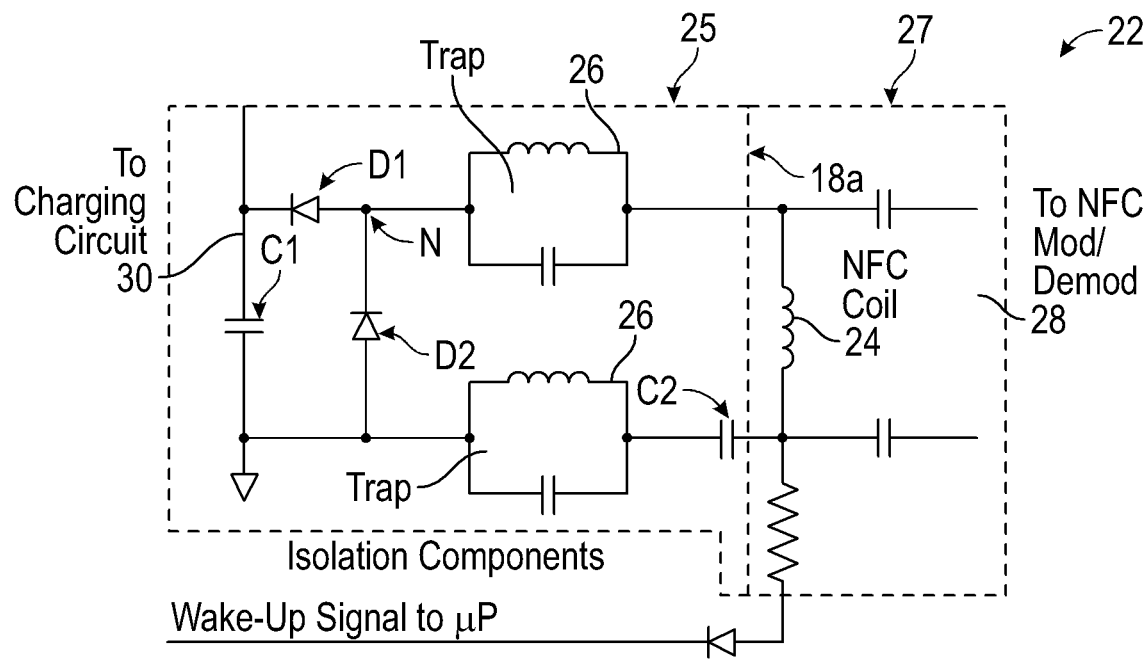
FIG. 3A is an exemplary circuit diagram of an exemplary communication device for use with the wearable device illustrated in FIG. 1.
Figure 3B:
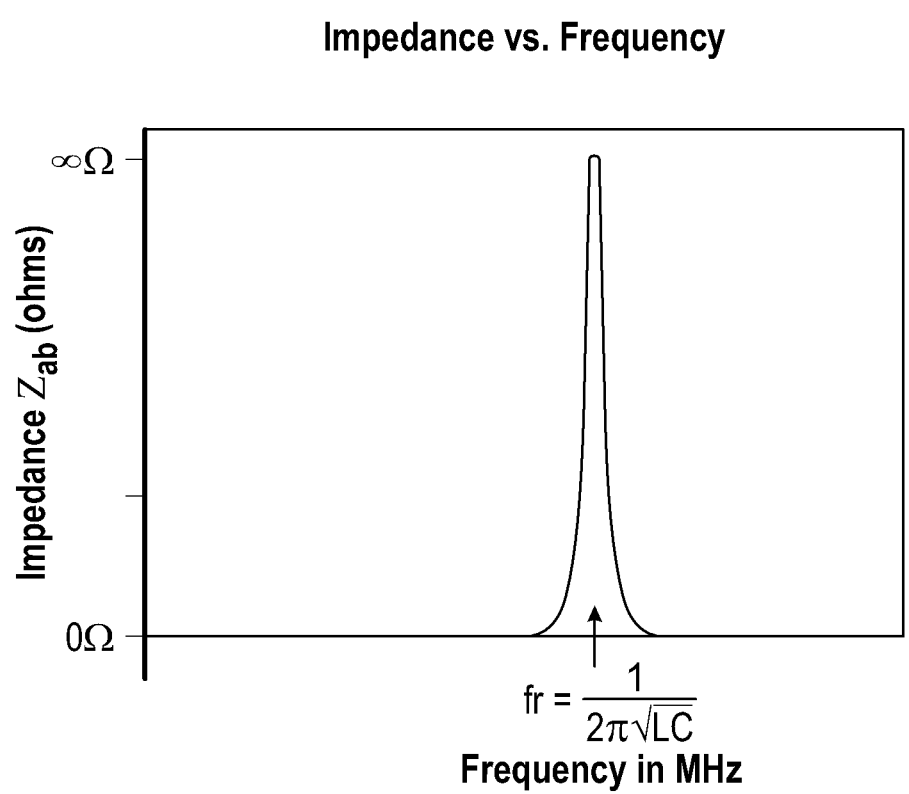
FIG. 3B is an exemplary graphical representation of impedance in the circuit illustrated in FIG. 3A.

FIG. 3A illustrates an exemplary circuit diagram 22 of an exemplary communication device 18a for use with the wearable device 10. Generally, the communication device 18a may include one or more receiving coils 24 used in Near Field Communications (NFC). Referring to FIGS. 2 and 3, in some embodiments, the recharge of the power source 20 may occur at about 13.56 MHz. In some embodiments, the recharge of the power source 20 may occur at a resonant frequency (e.g., at about the 6.78 MHz ISM band frequency).

Additionally, one or two resonant traps 26 (i.e., tank circuits, parallel LC circuit) coupled to the receiving coil 24 may be configured to isolate NFC transaction circuity 28 from charging circuity 30 as illustrated in FIG. 3A. In the presence of an alternating voltage (i.e., AC signal), the impedance of the circuit 22 may identify with the graphical representation shown in FIG. 3B. At the point of resonance, the circuit 22 may identify with an infinite resistance (e.g., essentially an open circuit or disconnected switch). The resonant traps 26 may be set to a resonant frequency of 13.56 MHz. With a "perfect" inductor and capacitor, components on a first side 25 of the resonant traps 26 may be isolated from the NFC on a second side 27 of the resonant traps 26. As such, energy may remain with the NFC such that range (i.e. distance) of transactions may be increased. In particular, in FIG. 3A, elements of the circuit 22 on the first side 25 include diodes D1 and D2 and capacitors C1 and C2. The purpose of D2 may be to clamp the voltage at a node N between the two diodes D1 and D2 from going negative resulting in capacitor C2 being charged positively. When the coil voltage changes polarity, the voltage on capacitor C2 may be added to the switched voltage (e.g., doubling the voltage) with a resulting peak voltage rectified by diode D1 charging capacitor C1. The coil voltage may reverse and capacitor C2 may again be charged with the process repeated. As the resonant traps 26 may not resonant at the 6.78 MHz frequency, the resonant traps 26 may pass energy such that voltage on the coil and capacitor C2 may pass to the diodes D1 and D2. The resonant traps 26 may be combined with the diodes D1 and D2 and the capacitor C2 to form a voltage doubler circuit. At the NFC frequency, energy may then be clocked from flowing to the diodes D1 and D2. For example, with charging frequency of 6.78 MHz, the resonant trap(s) 26 pass energy to the charging circuity 30 providing the power source 20 to be charged at the non-resonant 6.78 MHz ISM band frequency. Further, in some embodiments, the communication device 18a may default to a charging mode if the power source 20 has a charge below a predetermined baseline, e.g., devoid of charge.

Figure 4:
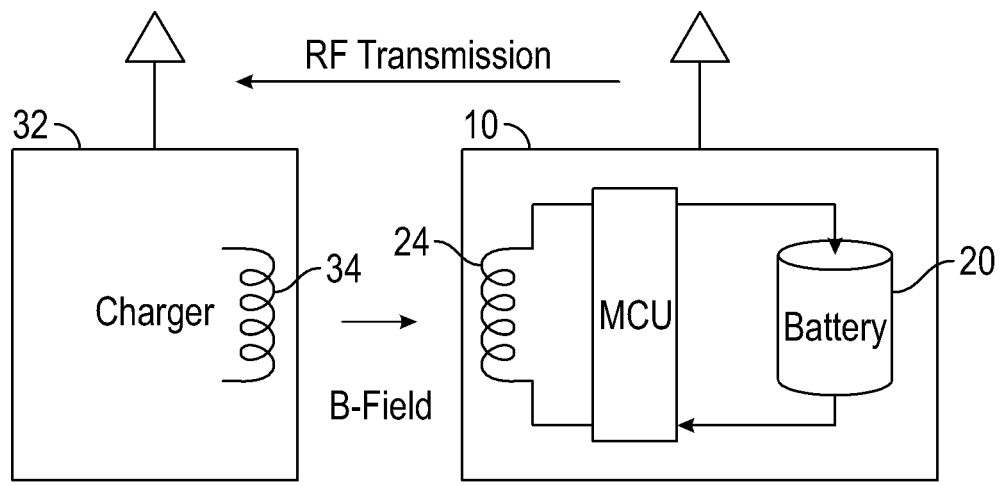
FIG. 4 is a circuit diagram illustrating communication between an external charger and the wearable device illustrated in FIG. 1.

Referring to FIG. 4, the wearable device 10 may be configured to discern between the NFC transaction and charging due to detection of the non-resonant charging frequency with the signal rectified by a diode. An external charger 32 may include a drive coil 34 with the wearable device 10 having the receiving coil 24. In some embodiments, an RF connection may be used to communicate battery voltage and/or battery current. In some embodiments, the wearable device 10 may signal the battery voltage to the external charger 32 via light emitting diode (LED) signalling. In some embodiments, passive or active near field load modulation may be used for communication between the wearable device 10 and the external charger 32.

To further reduce circuitry needed to charge the power source 20, the external charger 32 may include one or more intelligent chargers. Intelligent chargers may communicate with the wearable device 10 and vary energy during charging to maintain proper current and/or voltage levels to the power source 20.

In some embodiments, the one or more processors 14 may determine and report voltage level at the power source 20 to the external charger 32. In some embodiments, if the power source 20 is devoid of charge, and as such, at least one processor 14 is inoperable, charging operation may be initiated with a pre-charge level of Radio Frequency (RF) energy to the coil 24. This energy level may provide 0.05 C to 0.1 C current, for example, to pre-charge the power source 20 until a predetermined voltage level is reached (e.g., pre-charge termination voltage). At the predetermined voltage level, the processor 14 within the wearable device 10 may communicate voltage level of the power source 20 via the communication device 18 to the external charger 32. Once the predetermined voltage level is reached and the wearable device 10 communicates the voltage to the external charger 32, RF drive level may be altered to achieve a charging current of approximately 0.5 C. In some embodiments, the wearable device 10 may monitor and report to the external charger 32 current into the power source 20 to monitor charging current. In some embodiments, drive energy of the external charger 32 may be monitored to determine energy being absorbed by the wearable device 10. Correlation of the drive energy to the power source 20 may be used to determine charging current.

In some embodiments, a pre-determined target charge level (e.g., 0.5 C) may be maintained until the power source 20 reaches a charge termination voltage (e.g., 4.2 V). The wearable device 10 may report the voltage to the external charger 32 via the communication device 18 such that charge current may be reduced (e.g., by 50%) and charging may continue until voltage of the power source 20 again reaches termination voltage. At this point, drive level may be reduced while the process of monitoring of voltage and reducing drive level may continue until a minimum drive level (e.g., minimum battery current) is reached and charging discontinues.

Alternatively, drive level may be adjusted to maintain a constant voltage on the power source 20 until a minimum drive level (e.g., battery current) may be achieved and charging discontinues. During this process, the wearable device 10 may determine and report voltage to the external charger 32 such that a closed loop feedback operation may continue.

Figure 5:
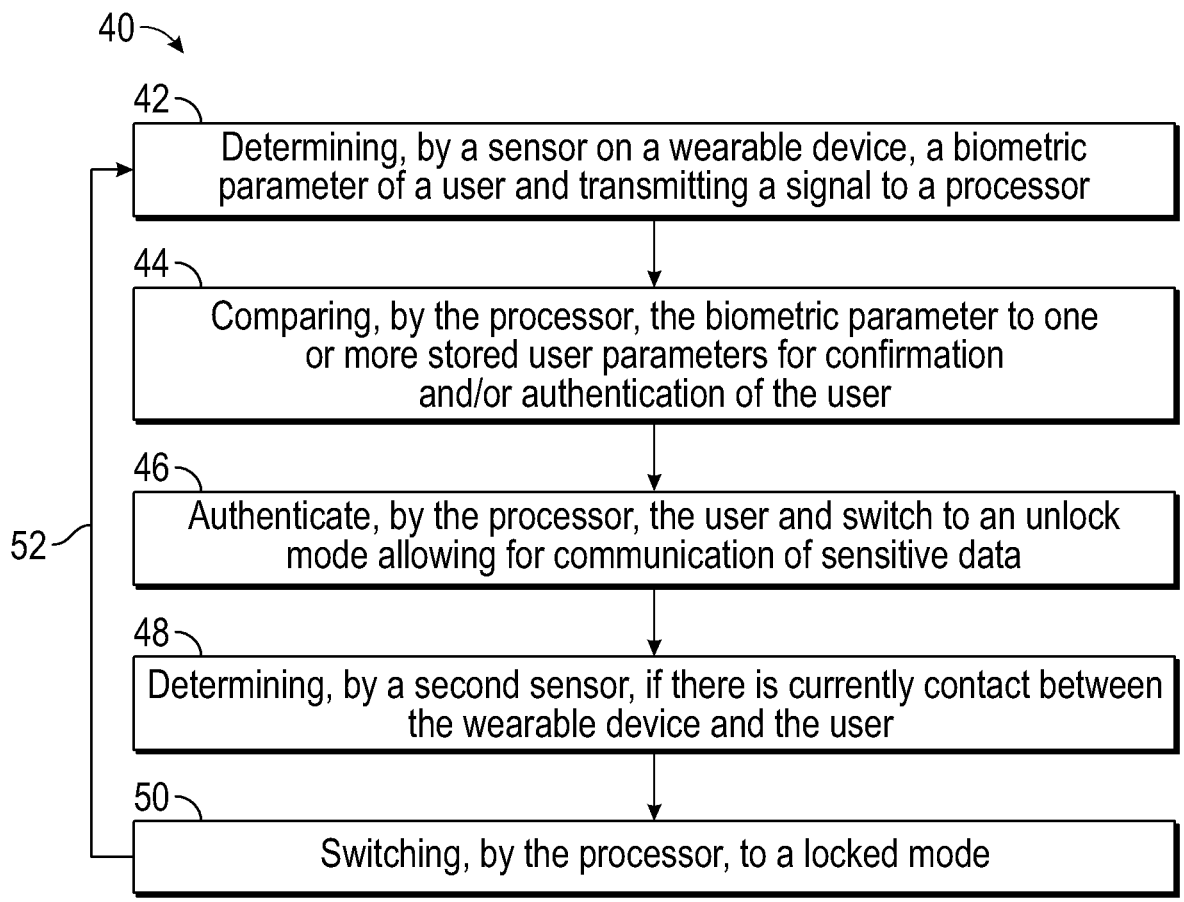
FIG. 5 illustrates a flow chart of an exemplary method for providing the wearable device in a locked mode and an unlocked mode such that an exemplary wearable device may be configured to process a key request and/or communicate sensitive data.

FIG. 5 illustrates a flow chart 40 of an exemplary method for providing the wearable device 10 in a locked mode and an unlocked mode such that the processor 14 may be capable of processing at least one key request and/or communicating sensitive data (i.e., data needing security). Because the wearable device 10 is activated with a fingerprint scan and having the wearable device 10 also proves possession, in this embodiment, the wearable device 10 is always providing at least two factors of authentication. Those two factors may be protecting one or more cybernetic keys, electronic keys, and/or the like in a multi-key security protocol.

In a step 42, the first sensor 12a (e.g., biometric sensor), may determine a biometric parameter and transmit a signal to the processor 14. In a step 44, the processor 14 may compare the biometric parameter to one or more stored user parameters for confirmation of the user. In some embodiments, validation of the biometric parameters may be determined using the algorithm described in U.S. Ser. No. 15/269,554, which is hereby incorporated by reference in its entirety. The method described therein may also be used to differentiate biometric parameters, validate biometric parameters, and/or supply a biometric key for use in decrypting secure information. In a step 46, the processor 14 may authenticate the user and switch to an unlock mode, allowing the processor 14 to communicate sensitive data. The wearable device 10 may remain in the unlocked mode as long as the wearable device 10 is still being worn. In a step 48, the second sensor 12b, may determine whether the wearable device 10 is still in contact with the user. The step 48 can be repeated periodically, randomly or on a schedule to determine at a variety of instants of time whether the wearable device 10 is still in contact with the user. In a step 50, if the wearable device 10 is not in contact with the user, the processor 14 may switch into a locked mode wherein the processor 14 may not communicate secure data. The user may then re-authenticate the wearable device 10 as indicated by arrow 52.

Figure 6:
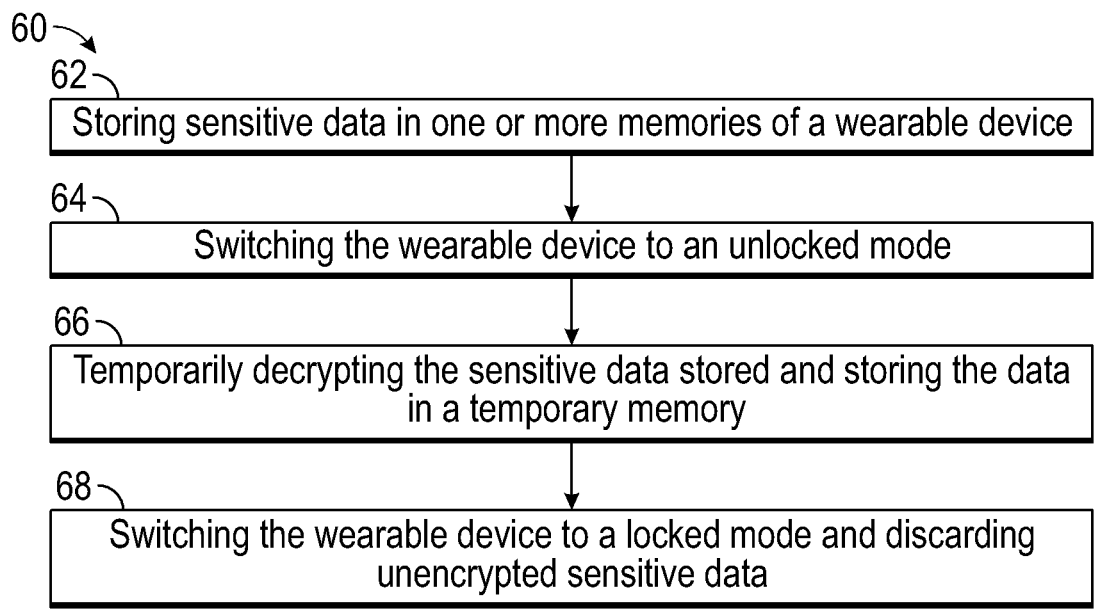
FIG. 6 illustrates a flow chart of an exemplary method for using an exemplary wearable device to process key requests.

FIG. 6 illustrates a flow chart 60 of an exemplary method for using the wearable device 10 to process key requests. By processing key requests, the wearable device 10 may be used as multi-factor security for one or more cybernetic keys, electronic keys, and/or the like. In a step 62, sensitive data may be stored in one or more memories 16. In some embodiments, sensitive data may be stored in an encrypted form in the permanent memory 16a. In a step 64, the wearable device 10 may be switched to the unlocked mode. In a step 66, with the wearable device 10 in the unlocked mode, the sensitive data may be temporarily decrypted and stored in the temporary memory 16b. Decryption may be by using biometric data and the biometric data hashing verification and security process described in U.S. Ser. No. 15/269,554, which is hereby incorporated by reference in its entirety. In some embodiments, the processor 14 may transmit decrypted sensitive information to one or more external systems, such as the paired device 19. In other embodiments, the processor 14 is configured to receive a cryptographic challenge from one or more external system, such as the paired device 19, determine whether the cryptographic challenge corresponds to the decrypted sensitive information, and respond to the cryptographic challenge in a first manner when the cryptographic challenge corresponds to the decrypted sensitive information, or in a second manner when the cryptographic challenge does not correspond to the decrypted sensitive information. The response in the first manner can be used by the paired device 19, for example, to authorize a transaction. The response in the second manner can be used by the paired device 19 to decline a transaction. In a step 68, the wearable device 10 may be returned to the locked mode (e.g., powered off, taken off) with the unencrypted sensitive data being discarded from the temporary memory 16b.

In another example, for authentication, a unique private cryptographic key may be stored for each use (e.g., website password, credit card data, access card data). Each private cryptographic key may include a corresponding public cryptographic key. The processor 14 may provide the corresponding public cryptographic key to an external system (e.g., NFC device). For logging in, for example, the external system may provide a challenge. The processor 14 in the unlocked mode may sign the challenge with the private cryptographic key as an answer to the challenge. The external system may use the public cryptographic key to verify that the challenge was signed with the private cryptographic key. As such, only the public cryptographic key may be used to verify the signature and the private cryptographic key remains in the processor 14. In another example, for authentication, secret protocols may be used wherein sensitive data may be shared by the processor 14 during one or more authentications (e.g., passwords, pin codes, identification numbers). Data may be the pass code instead of using of a cryptographic key, such as, for example, in a sequence of events.

Figure 7:
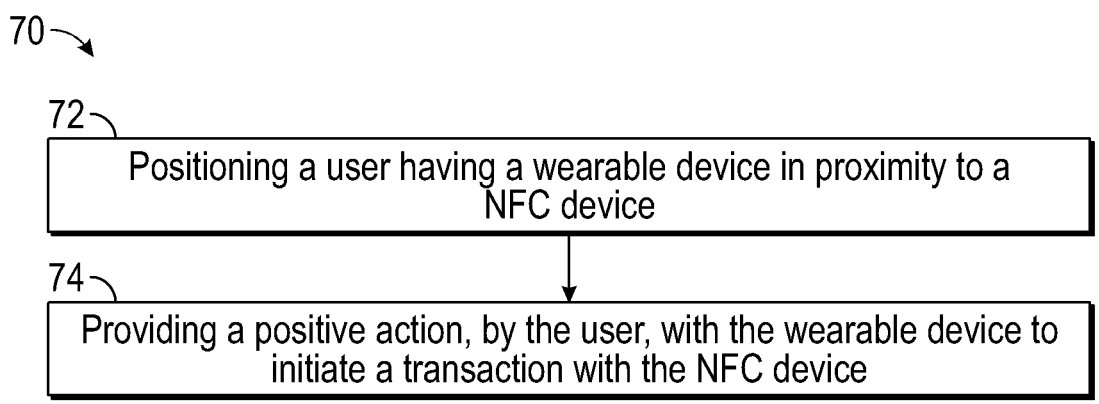
FIG. 7 illustrates a flow chart of an exemplary method for providing confirmation from a user of the wearable device.

FIG. 7 illustrates a flow chart 70 of an exemplary method for providing user confirmation from the user of the wearable device 10. By providing user confirmation from the user, the wearable device 10 may be used as multi-factor security for one or more cybernetic keys, electronic keys, credit cards, office access cards, transit cards, door lock keys, and/or the like. For example, by providing user confirmation from the user of the wearable device 10, a portable mock point of sale terminal or similar device used within close proximity of the wearable device 10 may be prevented from being inserted into transactions without the user's knowledge. In a step 72, the user may be positioned in proximity to a Near Field Communication (NFC) device. In a step 74, the user may provide a positive action (e.g., tapping the wearable device 10) to initiate a transaction with the NFC device. In some embodiments, one or more prompts from the wearable device 10 and/or the NFC device may be used to initiate the positive action by the user. In some embodiments, the wearable device 10 may include motion sensing capability. As such, movements of the wearable device 10 by the user, such as rotation (e.g., clockwise, counter clockwise), may be used. To that end, it may be possible to include a third factor of authentication by requiring that for selected transactions, a movement password may be executed. For example, a user may flip the wearable device 10 over clockwise once, tap twice, and rotate the wearable device 10 counter-clockwise back to the original orientation. When combined with possession of the wearable device 10, and identity of the user established via sensors 12, three factor authentication may be used for selected or all transactions.

Figure 8:
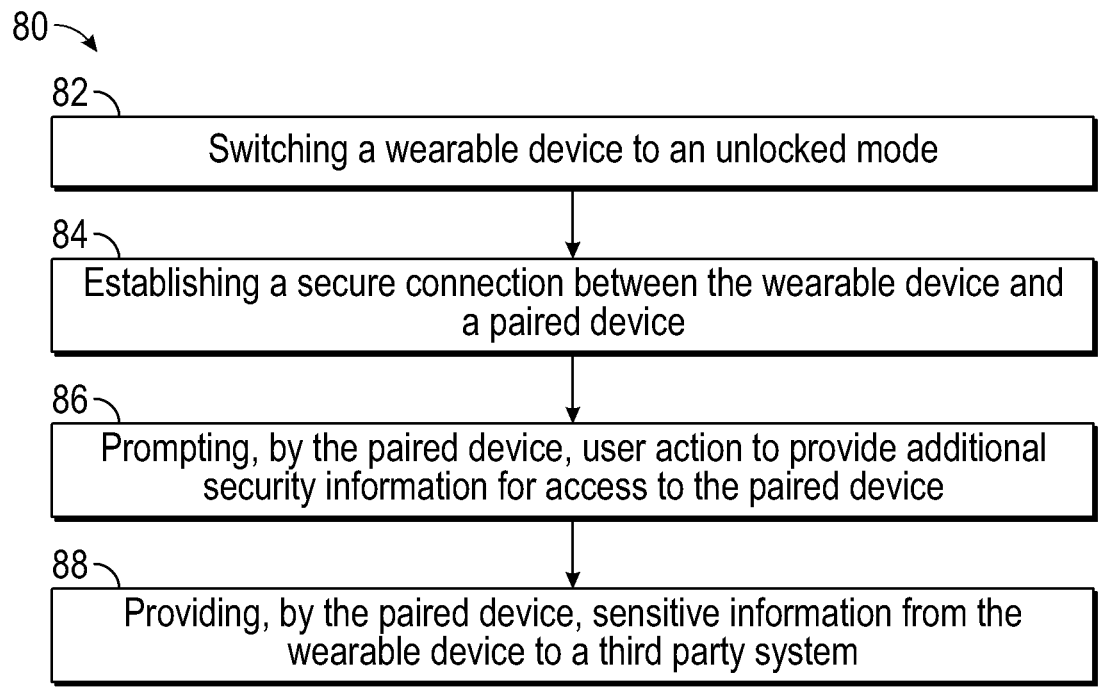
FIG. 8 illustrates a flow chart of an exemplary method for providing secure information from an exemplary wearable device to an exemplary paired device.

FIG. 8 illustrates a flow chart 80 of an exemplary method for providing secure information from the wearable device 10 to the paired device 19. In a step 82, the wearable device 10 may switch to the unlocked mode. In a step 84, the wearable device 10 may establish a secure connection with the paired device 19. In a step 86, the paired device 19 may prompt the user to provide additional security information for access. For example, the user may set up an account such that any transaction over an established amount requires the user to enter a 4-digit PIN to authorize the transaction. As such, the wearable device 10 would need to be in the unlocked mode to provide the sensitive information, and also the user may need to enter a 4-digit PIN into the paired device 19 through an application running on the paired device 19 in order to complete a transaction. In some embodiments, a hashed password may be transmitted to gain admittance. The hashed password may be entered by the user whenever access is requested. In some embodiments, a challenge and answer method may be used to obtain the password. In a step 88, the paired device 19 may provide sensitive information from the wearable device 10 to a third party system. For example, the paired device 19 may provide sensitive information from the wearable device 10 to a payment processing network or access granting system via the Internet. If the third party system is unable to receive communications directly form the wearable device 10, but is able to communicate via the Internet, the paired device 19 may provide sensitive information from the wearable device 10 to the third party system via the Internet. Additionally, the third party system may communicate with the wearable device 10 via the paired device 19.

In some embodiments, the secure connection between the wearable device 10 and the paired device 19 may be used to unlock a password vault system such that the user may use randomly generated complex passwords stored either in the wearable device 10 in an encrypted format or stored on the paired device 10 in an encrypted format. When a password is needed, a request may be made from the password vault. If the password vault is stored in memory 16 on the wearable device 10, the corresponding password may be selected and decrypted internally using a secure element stored key, biometric hash key, and decrypted password sent via the secure connection to the paired device 19. If the password is on the paired device 19, a stored master password within the memory 16 of the wearable device 10 may be decrypted using the secure element stored key or the biometric hash key, and the decrypted master password may then be transmitted via the secure connection to the password vault within the paired device 19. The decrypted master password may then be used to decrypt the corresponding password stored in the paired device 19.

In some embodiments, the wearable device 10 may be used to operate a keyless fob for automobiles, home entry, and/or the like. For example, in home entry system, the NFC antenna for the home lock may be installed into the door handle such that when the user grasps the door handle with the hand wearing the wearable device 10, the wearable device 10 may enter the antenna range of the NFC antenna and the door may be unlocked using the multi-factor authorization of the wearable device 10.

Figure 9:
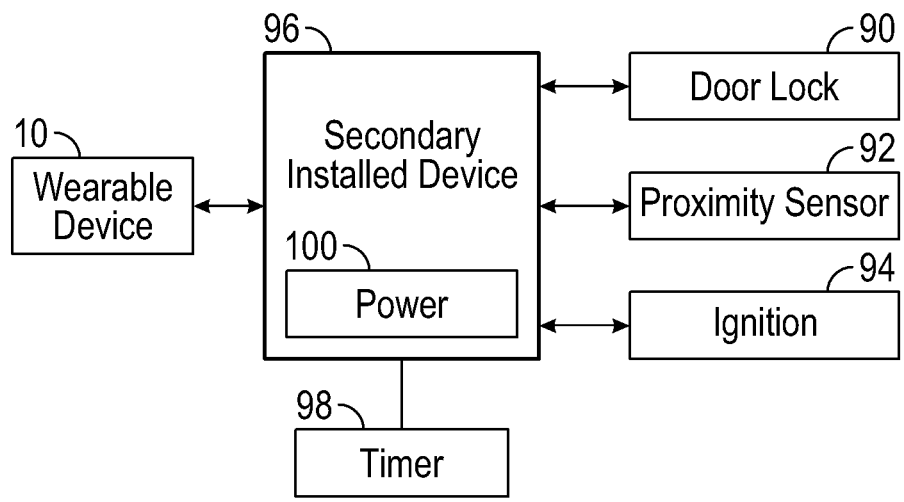
FIG. 9 illustrates a block diagram of an exemplary wearable device communicating with one or more automobile systems.

Referring to FIG. 9, in another example, for automotive systems, the wearable device 10 may communicate with one or more sensors (e.g., capacitive sensors) located within a door lock 90 of an automobile, one or more proximity sensors 92 on or within the automobile, the ignition starter 94 (e.g., start button), and/or the like. In some embodiments, a secondary installed device 96 may be positioned within the automobile, for example, on a dashboard or windshield. The secondary installed device 96 may alternatively be connected to an OBD-II diagnostics port, fuse panel, and/or the like. In some embodiments, the secondary installed device may emit an identification signal (e.g., Bluetooth Low Energy (BLE). The wearable device 10 may detect the identification signal, and connect to the secondary installed device 96. A secure connection may be established using multi-factor authentication described herein. The wearable device 10 may either have a continuous active radio, periodically active radio, or gesture activated radio (e.g., double knock) such that the wearable device 10 may be configured to conserve power.

Once authenticated, the secondary installed device 96 may power the fob circuitry, for example, thus indicating the fob is in proximity to the automobile. This may unlock doors of the automobile, start the automobile, and/or the like. The fob may remain active while the automobile is in operation. If the wearable device 10 leaves the proximity of the automobile (e.g., user stops driving and walks away from the automobile), the BLE connection may be disconnected causing the second installed device 96 to initiate a lock sequence and disable the fob circuit. In some embodiments, a motion sequence (e.g., a double knock) may be used to start a timer 98 such that a user has a pre-determined amount of time to leave the vehicle prior to the secondary installed device 96 initiating another unlock sequence. For example, a first motion sequence, such as a double knock, may be used to unlock the car and activate the start button, followed by a second motion sequence, such as a double knock, to deactivate the start button and lock the car.

In some embodiments, the secondary installed device 96 may include a power source 100. The power source 100 may be configured to recharge using power from the automobile, may be connected directly into the automobile, and/or may be recharged using solar cells, and/or the like. In some embodiments, the secondary installed device 96 may be built inside a tamper-resistant enclosure, such as, for example, FIPS 140-2 level 3 compliant, and may be configured to destroy the fob circuitry upon tampering. In some embodiments, the fob circuitry may be made by either altering an aftermarket fob or by using an existing fob and inserting the PCB into the installed device.

In some embodiments, the wearable device 10 may be used to unlock a smartphone, tablet, and/or the like. For example, the paired device 19 may be a smartphone, tablet, and/or the like, and the secure connection may be established between the wearable device 10 and the paired device 19. Further, settings may be altered such that the wearable device 10 need not provide the security password after the secure connection has been established between the wearable device 10 and the paired device 19. The same protocol may be used to unlock a desktop system.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A wearable device, comprising:
   a housing configured to be worn by a user;
   a first sensor supported by the housing and configured to sense presence of the user in contact with the housing;
   a second sensor supported by the housing and configured to sense at least one biometric parameter of the user in contact with the wearable device and output one or more signals representative of the biometric parameter;
   a communication device configured to provide wireless communication signals; and,
   at least one data processing system having one or more processor configured to receive the one or more signals representative of the biometric parameter and sensed presence of the user and compare the biometric parameter to a stored user parameter for authentication of the user, wherein upon authentication by the one or more processor, the one or more processor is configured to switch from a locked mode wherein the processor may not communicate secure data via the communication device to an unlocked mode to enable the one or more processor to communicate sensitive data, via the communication device.

2. The wearable device of claim 1, wherein the second sensor is configured to sense kinetic motion of the user and kinetic motion of the user is compared to the stored user parameter for authentication of the user.

3. The wearable device of claim 1, wherein the second sensor includes a plurality of accelerometers configured to sense movement of the user.

4. The wearable device of claim 1, wherein the one or more processor is configured to sense a movement password of the user.

5. The wearable device of claim 4, wherein the movement password of the user includes sensing of rotation of the housing.

6. The wearable device of claim 4, wherein the movement password of the user includes sensing of tapping of the housing.

7. The wearable device of claim 1, wherein the first sensor is configured to continuously sense proximity of the user.

8. The wearable device of claim 1, further comprising at least one indicator coupled to the one or more processor and configured to provide one or more states of the wearable device.

9. A wearable device, comprising:
   a housing configured to be worn by a user;
   at least one sensor supported by the housing and configured to sense at least one biometric parameter of the user in contact with the wearable device and output one or more signals representative of the biometric parameter;
   a communication device configured to provide wireless communication signals; and,
   at least one data processing system having one or more processor configured to:
      receive the one or more signals representative of the biometric parameter and compare the biometric parameter to a stored user biometric parameter for authentication of the user, wherein upon authentication by the one or more processor, the one or more processor is configured to switch from a locked mode wherein the processor may not communicate secure data via the communication device to an unlocked mode to enable the one or more processor to communicate sensitive data, via the communication device, indicative of at least two factors conforming to requirements of a multi-factor authentication scheme;
      receive one or more signals representative of kinetic motion of the user and sense a movement password of the user; and,
      transmit the movement password via the communication device.

10. The wearable device of claim 9, wherein the least one sensor includes a plurality of accelerometers configured to sense movement of the user.

11. The wearable device of claim 9, wherein the movement password of the user includes sensing of rotation of the housing.

12. The wearable device of claim 9, wherein the movement password of the user includes sensing of tapping of the housing.

13. The wearable device of claim 9, further comprising at least one sensor configured to continuously sense proximity of the user.

14. The wearable device of claim 9, further comprising at least one indicator coupled to the one or more processor and configured to provide one or more states of the wearable device.

15. A method comprising:
   sensing, by at least one accelerometer, a biometric parameter of a user and transmitting the biometric parameter to one or more processor, at least one of the processors positioned in a wearable device on an appendage of the user;
   authenticating, by the one or more processor, the user using the biometric parameter and one or more stored parameters;

sensing, by the at least one accelerometer positioned in the wearable device, a movement password of the user;

switching the one or more processor from a locked mode wherein the processor may not communicate secure data via a communication device to an unlocked mode responsive to authenticating the user enabling the one or more processor to communicate sensitive data, via the communication device; and, transmitting the movement password of the user via the communication device.

16. The method of claim 15, further comprising the step of sensing, by at least one sensor on the wearable device, continuous presence of the user.

17. The method of claim 16, further comprising the step of maintaining the one or more processor in the unlocked mode by monitoring the continuous presence of the user.

18. The method of claim 15, further comprising the step of transmitting, via the communication device, sensitive information stored in a temporary memory of the one or more processor.

19. The method of claim 18, further comprising the step of discarding the sensitive information stored in the temporary memory when the one or more processor are in the locked mode.

20. The method of claim 15, wherein authenticating includes a multi-factor authentication scheme.

* * * * *